United States Patent [19]

Anderson, Jr.

[11] Patent Number: 5,354,101
[45] Date of Patent: Oct. 11, 1994

[54] SEALING WASHER BLOCK CONNECTION

[75] Inventor: Russell C. Anderson, Jr., North Tonawanda, N.Y.

[73] Assignee: General Motors Corporation, Detroit, Mich.

[21] Appl. No.: 119,300

[22] Filed: Sep. 13, 1993

[51] Int. Cl.⁵ .................................................. F16L 39/02
[52] U.S. Cl. ........................................ 285/25; 285/30; 285/130; 285/137.1
[58] Field of Search ................. 285/137.1, 24, 25, 26, 285/27, 28, 29, 130, 131, 30, 211, 212

[56] References Cited

U.S. PATENT DOCUMENTS

| | | | |
|---|---|---|---|
| 3,198,480 | 8/1965 | Morse | 251/148 |
| 3,966,235 | 6/1976 | Lewis | 285/25 |
| 4,382,619 | 5/1983 | Grisebach | 285/325 X |
| 4,555,130 | 11/1985 | McClain | 285/26 |
| 4,611,831 | 9/1986 | Truchet | 285/137.1 |
| 4,630,847 | 12/1986 | Blenkush | 285/137.1 X |
| 4,790,568 | 12/1988 | Skibowski | 285/28 |
| 4,796,896 | 1/1989 | Anderson, Jr. | 285/137.1 |
| 4,900,065 | 2/1990 | Houck | 285/137.1 |

FOREIGN PATENT DOCUMENTS

| | | | |
|---|---|---|---|
| 2611058 | 11/1976 | Fed. Rep. of Germany | 285/137.1 |
| 2615818 | 10/1977 | Fed. Rep. of Germany | 285/137.1 |
| 0542222 | 1/1957 | Italy | 285/30 |
| 0772158 | 4/1957 | United Kingdom | 285/137.1 |

Primary Examiner—Randolph A. Reese
Assistant Examiner—Heather Chun
Attorney, Agent, or Firm—Patrick M. Griffin

[57] ABSTRACT

An evaporator connection assembly in an automobile refrigerant system interconnects the inlet and outlet pipes or lines of an evaporator to supply and suction lines for connection to the condenser and compressor. The assembly utilizes a connection block comprising two halves, namely a plate and block. The block is fixedly connected to the evaporator pipes and the plate is connected to the supply and suction lines. The two halves are thereafter secured to one another. Planar seal surfaces are provided between the block and plate for receiving a sealing washer.

2 Claims, 3 Drawing Sheets

SEALING WASHER BLOCK CONNECTION

TECHNICAL FIELD

The invention relates to refrigerant systems of vehicles, and more particularly to the connection of fluid lines to the evaporator in the form of a sealing block.

BACKGROUND OF THE INVENTION

Automotive air conditioning systems typically consist of a compressor to increase the pressure of refrigerant, a condenser or heat exchanger to transfer thermal energy from the high pressure refrigerant to the surrounding environment, an expansion device to throttle the high pressure refrigerant at constant enthalpy to a lower temperature, and an evaporator to transfer thermal energy from the conditioned space to the refrigerant. Associated interconnecting lines, tubing, and hoses contain and convey refrigerant between the components of the system. In most modern automotive air conditioning systems, the compressor is engine mounted so that the engine power train can conveniently drive the compressor via belts, gears, etc., while the heat exchanger components are body mounted in close proximity to the working air-side fluid. For example, the condenser is mounted in front of the vehicle, ahead of the radiator so that a sufficient quantity of cooler air is directed over its heat transfer surfaces for adequate performance during most operating conditions. Another example is the evaporator which is mounted inside of a plastic case or module near the passenger compartment so that air handling and ducting of fresh, conditioned air is facilitated easily. As a result of these packaging constraints, it is often necessary to locate the threaded connectors, which are on the ends of the lines, tubing and hoses, in areas that are not easily accessible to the assembly operator. One method of reducing the amount of accessible area needed to assemble these connections is the use of a block fitting which uses a single bolt to draw two halves of the connection together. In this manner, only clearance for a socket and wrench extension is needed.

The conventional O-ring style block is currently used on an evaporator. An aluminum inlet pipe and an aluminum outlet pipe are welded to the evaporator core on one end and are welded or brazed to the back side of an evaporator block fitting. An inlet port and outlet port are internally machined into the front surfaces of the evaporator block fitting in such manner that a nearly vertical O-ring sealing surface is formed inside the outlet port and the inlet port. On the opposing side of the connection, a plate-like customer block receives the formed aluminum end of the suction hose and the liquid line. The liquid line fits into a slot in the customer block. The purpose of the slot is to eliminate the need to precision machine the center-to-center distance dimensioned between the suction hose and the liquid line end in the customer block. In assembling the block, two toroidally-shaped elastomeric O-rings are slidably installed onto the formed male ends of the aluminum pipes. The connection halves are then brought together to engage the male pipe ends into the machined bores in the evaporator block. An externally threaded hexagon head fastener is then inserted through a centrally located hole in the customer block to engage an internally threaded hole in the evaporator block.

Problems are associated with the use of the conventional O-ring style block fitting.

First, the O-rings are not observable by the assembler as the halves of the joint are brought together. Consequently if an O-ring is misaligned so as to be pinched or forced out of the female sealing cavity, the problem may go unnoticed until a refrigerant leak occurs during operation of the air conditioning system.

Secondly, the lines connecting the customer block to the compressor and to the condenser are often not sufficiently flexible to permit an easily controlled insertion into the female seating cavities. Consequently, angularity may be introduced between the longitudinal axes of the ports in the evaporator block and the longitudinal axes of the ports in the customer block. Such angularity often causes uneven elastomeric compression on conventional O-ring type block fitting joints during insertion, resulting in cut, pinched, or otherwise damaged O-rings.

Thirdly, the male end forms, or terminations, used with conventional O-ring style line connections are typically formed via an upsetting process onto the ends of aluminum or steel tubes. These formed ends typically have characteristic microscopic disparities, or "tooling marks," that run perpendicular to the direction of the seal itself as a consequence of the forming operation. These microscopic disparities subtract from the contact area between the mating sealing surfaces and the seal itself, resulting in greater long-term refrigerant leakage than would be possible with a design having concentrically parallel, or circumferential "tooling marks".

A sealing washer compressor connection has been used, but is not directly applicable to the evaporator without significant changes. In the sealing washer compressor connection, the cast housing of the compressor has a nearly figure-8 shaped portion or boss for the female sealing cavities of the suction port and the discharge port of the compressor. The other half of the connection consists of a compressor block that has machined onto the front face two raised, stepped surfaces on the suction and discharge sides respectively, the outboard plane of which serves as the sealing surfaces. The back side of the compressor block has two counter bores or sockets machined into it for reception and welding of the suction pipe and the discharge pipe thereto. Two sealing washers are slidably installed onto the machined male diameters on the front side of the compressor block until they bottom out or touch the plane of the raised faces on the compressor block. The sealing washers each consist of a metallic retainer, punched, coined and optionally splined that has bonded to the inner periphery an elastomeric material that is compatible with the refrigerant system and the fluids contained therein. An externally threaded hexagon head attachment bolt is then inserted through a hole in the compressor block to engage an internally threaded hole in the compressor to firmly hold the two halves of the connection together when tightened. This type of connection is not directly applicable to evaporator or condenser connections because the liquid line and suction lines typically are routed in a circuitous manner in different paths that require separate connections at the evaporator or condenser. Furthermore, the precision design of port-to-port dimensions in a one-piece compressor block connection may be too costly for use in multi-port sealing washer block connections.

SUMMARY OF THE INVENTION

This invention is an evaporator connection assembly for connecting input and output lines to an evaporator. The assembly comprises supply and return lines for connection to a condenser and compressor, and evaporator lines for connection with the evaporator. Also included is connection means for receiving and sealingly interconnecting the evaporator lines and the supply and return lines for allowing fluid communication therebetween. The connection means comprises plate means for receiving the supply and return lines and block means for receiving inlet and outlet pipes of an evaporator or lines. The plate means has an aperture therethrough for fixedly receiving at least one of the supply and return lines and an opening therethrough for receiving the other of the supply and return lines on a first side thereof, and for establishing raised surfaces circumferentially about the aperture and opening on a second side thereof. The block means has a pair of passages therethrough for fixedly receiving the evaporator pipes at a first surface, and providing a pair of planar seal seats extending radially about the passages at a second surface thereof. Sealing means provides first and second parallel opposing planer surfaces for sealing between the raised surfaces and the planar seal seats. Securing means secures the plate means to the block means to compress the seal therebetween to provide a leak free fluid communication between the supply and return lines and the evaporator pipes. Another feature of the invention is that the plate means and block means have outer surfaces thereon arranged to provide a post assembly for observing whether O-ring seals are properly seated.

BRIEF DESCRIPTION OF THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
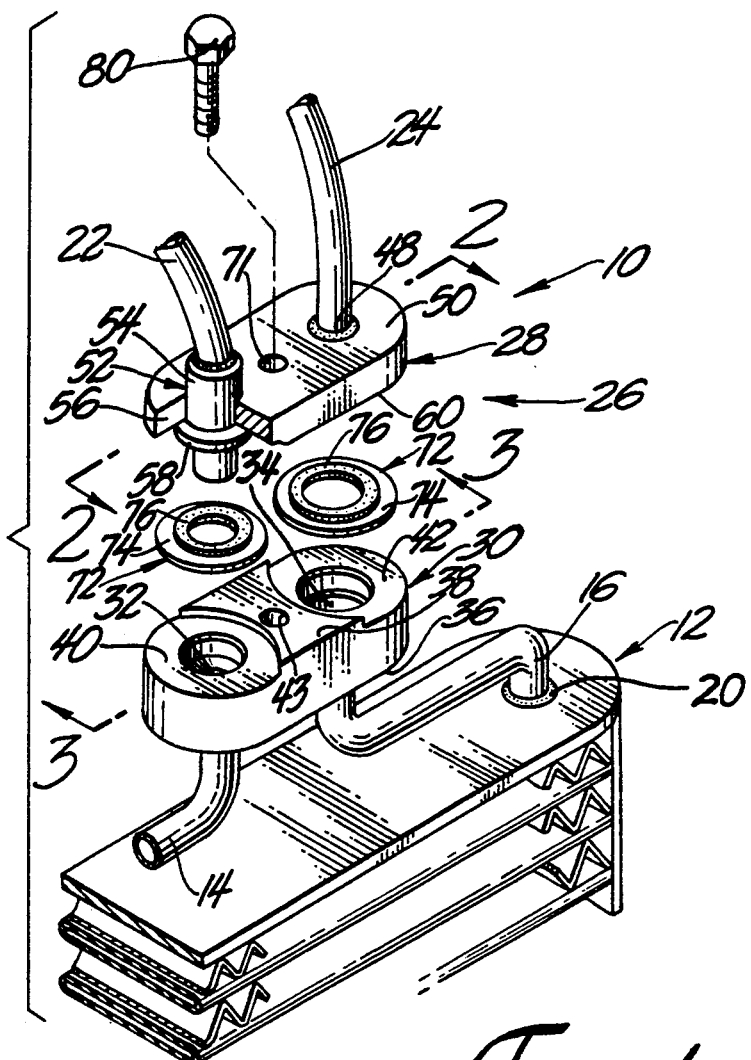
FIG. 1 is an exploded perspective view of the evaporator connection assembly.

An evaporator connection assembly is generally illustrated at (10) in FIG. 1. The evaporator connection assembly (10) is adapted to connect an evaporator (12) to a condenser and compressor (not shown) in a refrigerant system. It is to be understood that the invention is applicable to other types of heat exchangers, such as a condenser.

An aluminum inlet pipe (14) and an aluminum outlet pipe (16) each have an end connected at a welded joint (20) to the evaporator (12). A liquid or supply line (22) receives liquid from the condenser through an expansion valve, as commonly known in the art, for supplying high pressure liquid refrigerant to the evaporator. An aluminum suction pipe (24) receives low pressure gaseous refrigerant from the evaporator (12) to communicate same to the compressor. The suction pipe (24) has a diameter greater than the diameter of the supply line (22). The assembly (10) includes connection assembly means (26) for receiving and sealingly interconnecting the evaporator pipes or lines (14), (16) and the supply and return lines (22), (24) in fluid communication, respectively.

The connection assembly means (26) comprises plate means (28) and block means (30). The plate means (28) receives the supply and return lines (22, 24) and the block means (30) receives the evaporator pipes (14, 16) wherein the plate means (28) and block means (30) are joined to interconnect the pipes (14, 16), and lines (22, 24) in fluid communication therebetween.

The block means (30) has a pair of passages (32, 34). The block means (30) receives the evaporator pipes (14, 16) on a first face (36) thereof wherein the evaporator pipes (14, 16) are welded or brazed, respectively, to the block means (30) at connection joints (14a, 16a). The second face (38), of the block means (30) opposite the first face (36), provides a pair of horizontal planer seal seats (40, 42) extending circumferentially about the passages (32, 34). The seal seats (40, 42) are recessed within the second face (38). The passages (32, 34) respectively include a tapered conical segment (44, 46) between a wider diameter segment (32a, 34a) of the passages (32, 34) at the pair of horizontal planar seal seats (40, 42) to a smaller diameter segment (32b, 34b) thereof at the point where diameter segment (32c) and (32d) widen to accept pipes (14) and (16) respectively. The block means (30) also includes a threaded, connecting hole (43) formed therethrough parallel with the passages (32, 34).

The plate means (28) includes a passage (48) therethrough for receiving the return line (24) which is welded, brazed, etc. to the plate means (28) at a first or external side (50) thereof. The plate means (28) also includes a slot (52) therethrough to receive the supply line (22). The plate means (28) includes a central aperture (71) therethrough and parallel with the axis of the aperture (48) and opening (52) for receiving a fastener (80), as subsequently discussed. The plate means (28) includes two alternate configurations relating to the connection of the supply line (22) thereto. The two embodiments include similar reference numeral indicating similar members which are unprimed for the first embodiment and primed for the second embodiment.

Figure 2:
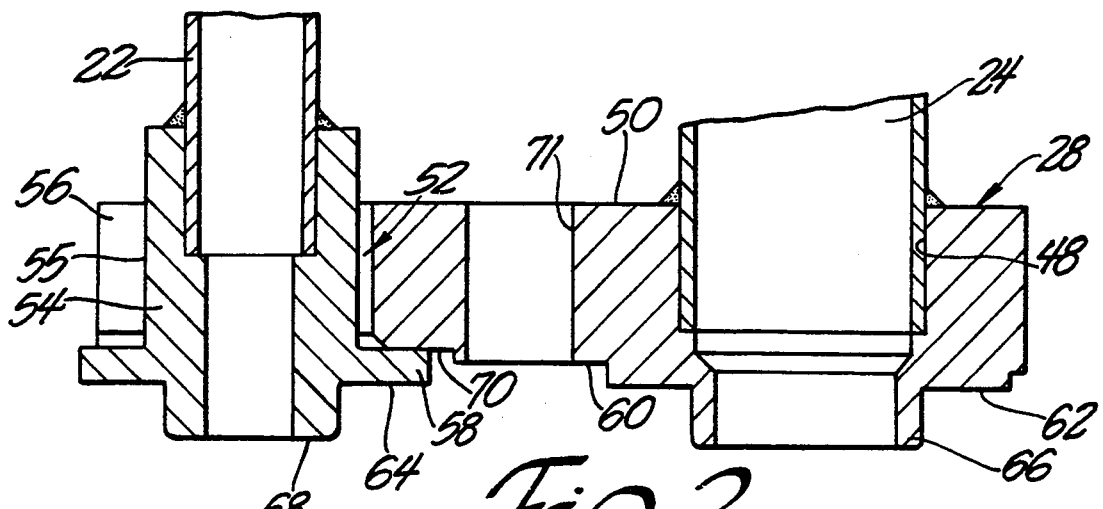
FIG. 2 is a cross-sectional view taken along lines 2—2 of FIG. 1.
Figure 3:
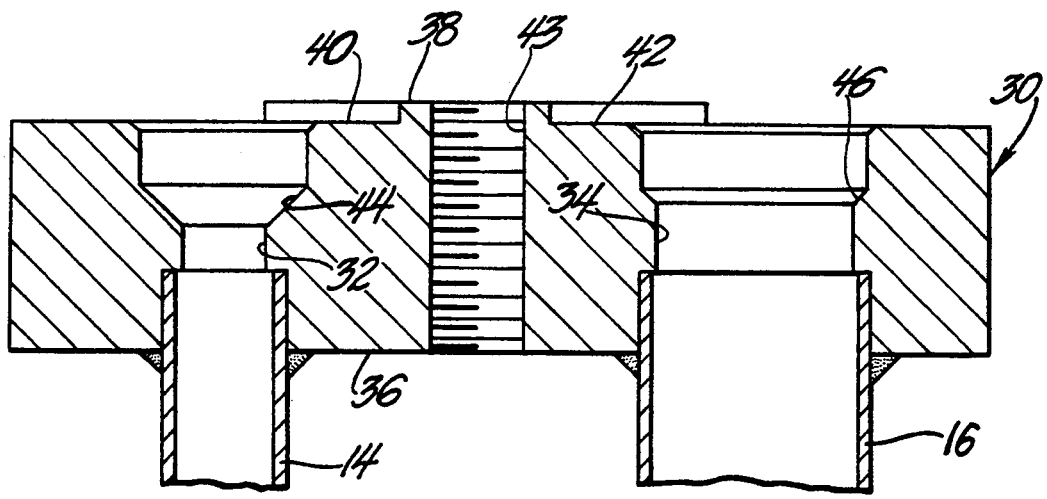
FIG. 3 is a cross-sectional view taken along lines 3—3 of FIG. 1.
Figure 4:
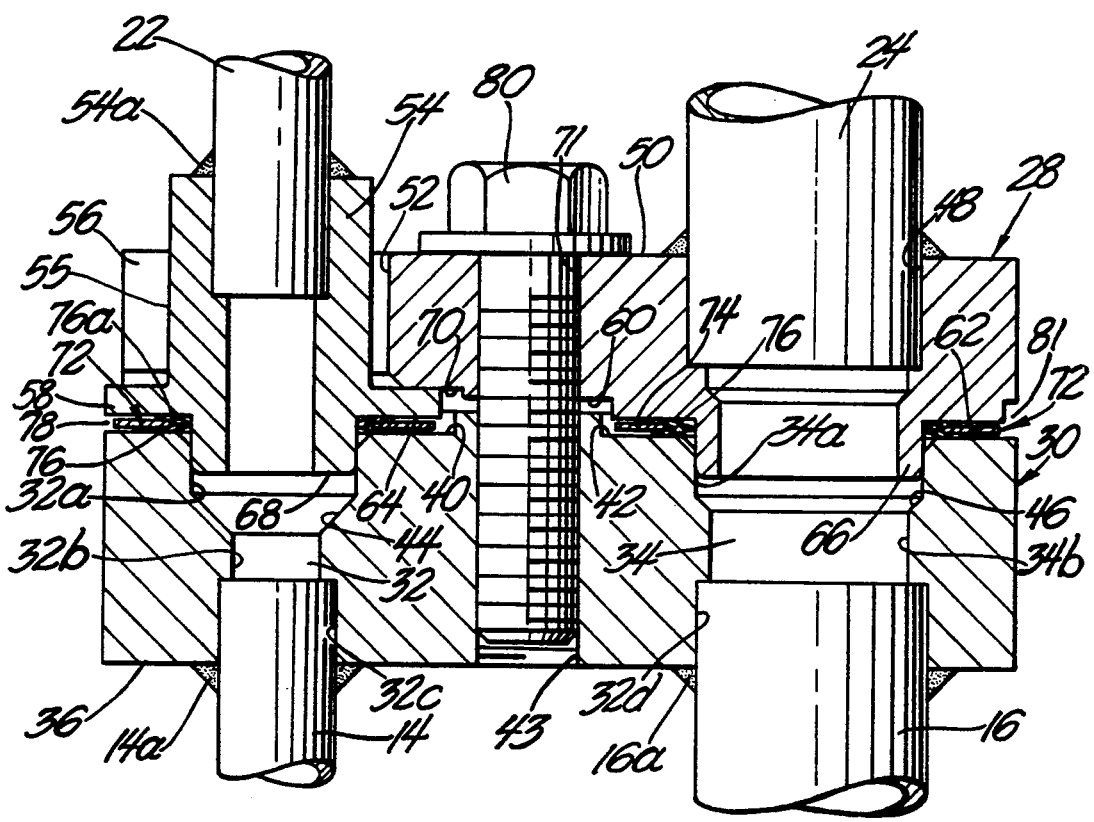
FIG. 4 is a cross-sectional view of the views of FIGS. 2 and 3 in the final assembly.

The first embodiment of the plate means (28) includes a slotted design as illustrated in FIGS. 1-2 and 4 wherein the supply line (22) may be slid within the slot (52) and positioned therein and axial to the evaporator line (14) and passage (32). The slot (52) includes two parallel, spaced vertical interior walls (56). In this embodiment, the supply line (22) includes an end form bushing (54) attached and welded to the supply line (22) through the process of welding, brazing, or other means at a connection joint (54a). The end form bushing (54) is slidably fit into the slot (52). The interior walls (56) engage a cylindrical outer surface (55) of bushing to guide and orient the bushing (54) in a direction transverse to the axis of the supply line (22). Accordingly, the bushing (54) has its longitudinal axis maintained colinear with the axis of the line (14). Therefore, a welded attachment is permitted to move transversely to the pipe axis for improved flexibility and reduced dimension precision. The bushing (54) includes an enlarged radial flange (58) of a diameter greater than the slot (52) width for sliding engagement against the second or internal face (70) of the plate means (28).

The second face (60) of the plate means (28) provides a raised or projecting surface (62) radially about the passage (48), and includes a cylinder (66) extending therefrom communicating the passage (48) with the passage (34) and piloting the plate means (28) in passage segment (34a). The second face (60) includes a circumferential recess (70) for receiving the flange (58) therein. The front face of the flange (58) provides a raised surface (64) parallel and planar with the raised surface (62). The bushing (54) also provides a cylindrical projection (68) for piloting reception in the passage segment (32a) of by the passage (32).

Figure 5:
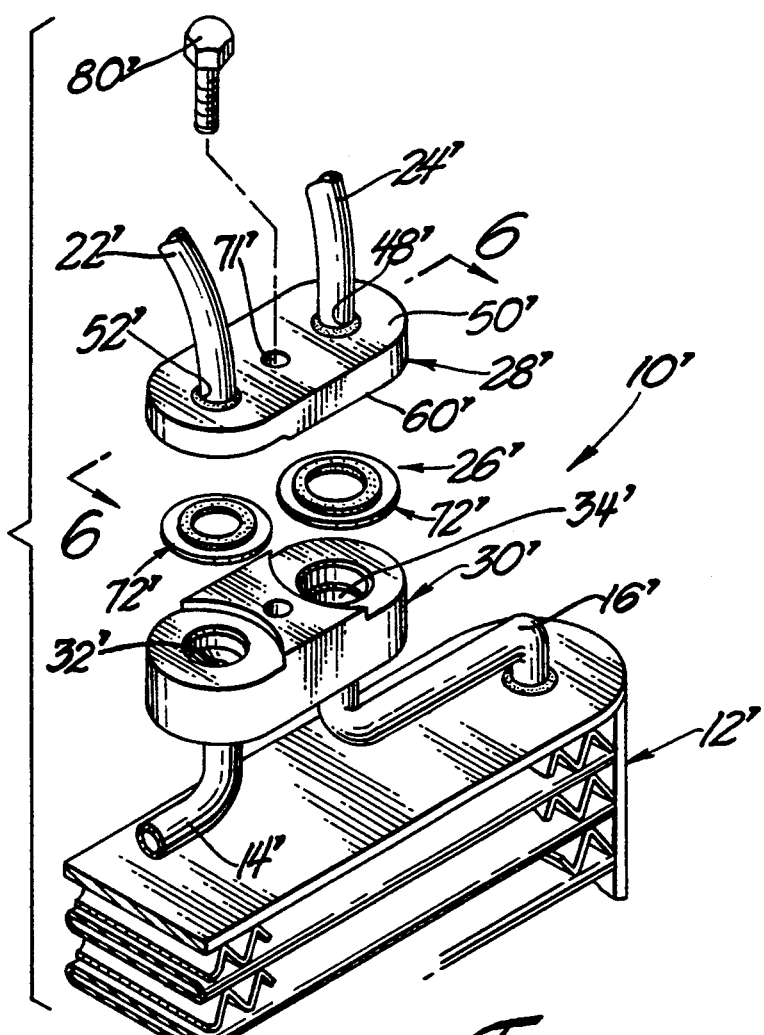
FIG. 5 is a perspective view of a second embodiment of the plate means.
Figure 6:
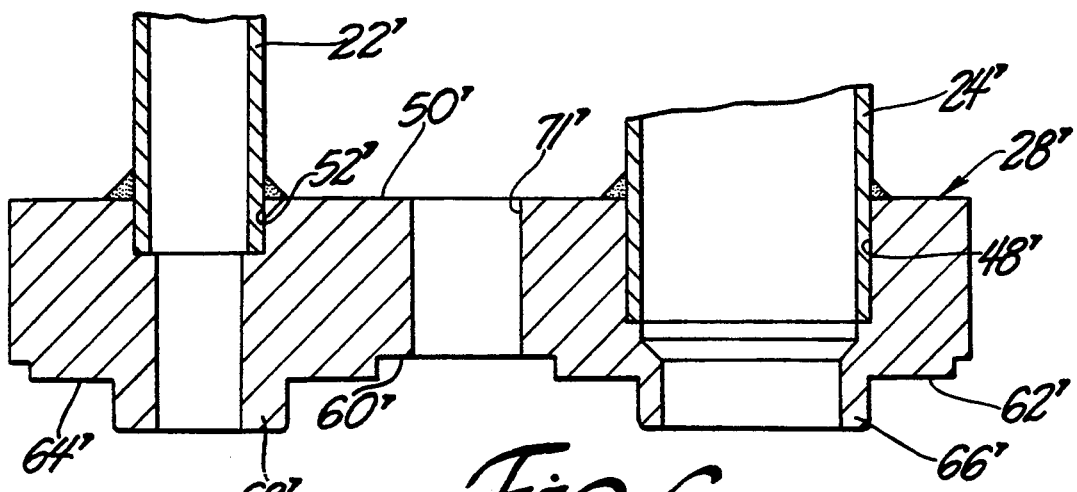
FIG. 6 is a cross-sectional view taken along lines 6—6 of FIG. 5.

A second embodiment of the plate means (28') includes an unslotted configuration as illustrated in FIGS. 5-6. The opening (52') is generally a circular bore to receive the supply line (22') by welding thereof, similar to the connection of the return line (24'). Therefore, the supply line (22') is connected in the same manner as the return line (24'), along with all other members. The second face (60') of the plate means (28') has raised or projecting surfaces (62',64') radially about the aperture (48') and the opening (52') on the second side (60'). The raised faces (62',64') are also provided with cylindrical projections (66',68') communicating the aperture (48') and opening (52') with the passages (32',34') of the block means (30'). The raised face (64') and the projection (68') are integral with the plate means (28') as with relation to the return line (24').

The assembly (10) also includes sealing means (72). The sealing means (72) is generally a sealing washer (72) which consists of a metallic retainer (74), punched, coined and optionally splined that has bonded to the inner periphery a crowned elastomeric ring (76) that is compatible with the fluids. The elastomeric ring (76) has a crown (76a) of a height greater than height of the metallic retainer (74). The sealing washer (72) is placed about the projection (66, 68). The diameter of the washer (72) is slightly less than the diameter of the raised surfaces (62, 64) to protect the edges of the washers (72) from being snagged, lifted, or otherwise pulled away from the sealing surfaces during and after installation. When assembled, the washer (72) fits within the sealing seat (40, 42) of the block means (30). The diameter of the sealing seat (40, 42) is greater than the diameter of the washer (72) and raised surfaces (62, 64) to form gaps (78, 81) to allow visual observation that the sealing washers (72) are properly placed therein. The diameter of the seats (40, 42) extends beyond the block means (30), with the edges of the washer (72) extending within the edges of the block means (30). An externally threaded hexagon head attachment bolt (80) is inserted through the aperture (71) to engage the internally threaded hole (43) of the block means (30).

The sealing seats (40, 42) provide a horizontal sealing surface which is parallel to the raised surfaces (64, 62). The raised surfaces (64, 62) are machined in a circuitous manner so that microscopic formations or disparities from the machining operation are imparted to the faces (62, 64) in a direction that is circular, or parallel, to the circumference of the seal. The sealing washers (72) may or may not have the same inside and outside diameters. However, the sealing washers (72) must have the same nominal thickness to ensure uniform contact between the sealing surfaces on both sides of the sealing washers and the elastomeric crown (76a) of the sealing washers (72) themselves.

In assembly, the two disk shaped sealing washers (72) having the elastomeric ring (76) are slidably installed onto the machined projections (66), (68) of the plate means (28). The plate means (28) and block means (30) are then brought together to engage the projections (66, 68) with the machined passages (32, 34), respectively, in the block means (30). The externally threaded hexagon head fastener (80) is then inserted through the hole (71) to engage the hole (43) in the block means (30).

The assembly (10) provides a sealing washer connection design which is an improvement over the conventional O-ring style block connection design in performance due to use of a compression type seal (72), or face seal, as opposed to hybrid radial type seals for tube 0-seal, with the former having much improved performance with regards to refrigerant containment. The improvement is a result of more surface contact area between the sealing washer crown (76a) and the block fitting sealing surfaces (40, 42, 62, 64) than between the prior art O-ring and the walls of the vertical sealing cavity. Furthermore, there is reduced variation and dimensional tolerance accumulation due to the fewer number of component parts that effect seal compression; i.e., the subject invention is affected by two components (washer thickness and rubber crown height) whereas the prior art block connection is effected by three components (O-ring thickness, male pilot diameter, female sealing cavity diameter). Additionally, the use of a circular surface finish pattern which is parallel to the circumference of the sealing member as opposed to an axial finish direction, perpendicular to the sealing circumference, results in reduced refrigerant loss and emissions to the environment in the long term. Furthermore, assembly of the assembly (10) is not affected by angularity introduced into the assembly process as a result of line, tubing and hose stiffness, process variation and human factors as the conventional prior art connection eliminating the problem of cutting. Furthermore, the end form bushing is advantageous to facilitate separation of the line leading to the evaporator from the line leading away from the evaporator, and permits a flange diameter to be fabricated of sufficient size to act as a sealing surface for the sealing washer crown that bears thereagainst. The gap or space (78, 81) between the block means (30) and the plate means (28) when sealing washers are correctly installed may be visually established without discharging the refrigerant system or performing any other checks or diagnosis.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. In an evaporator connection assembly for connection of an evaporator to a condenser and compressor, and said assembly having:

supply and return lines operatively connected to a condenser and compressor;

evaporator lines for connection with the evaporator;

connection means for receiving and sealingly interconnecting said evaporator lines and said supply and return lines; and said connection means comprising plate means for receiving said supply and return lines block means for receiving said evaporator lines, and securing means for securing said plate means against said block means for sealingly allowing communication of fluid between said evaporator lines and said supply and return lines the improvement comprising;

said plate means including first and second sides, and having an aperture therethrough for fixedly receiving at least one of the supply and return lines and an opening to receive the other of the supply and return lines at said first side thereof, said plate means having raised faces circumferentially about said aperture and said opening on said second side;

said block means having first and second surfaces, and a pair of passages therethrough for fixedly receiving said evaporator lines at said first surface, and providing a pair of planar seal seats extending about said passages at said second surface thereof wherein a gap is provided between said raised faces and said seal seats for allowing visual inspection of said sealing means therebetween; and sealing means providing first and second opposing parallel surfaces for sealing between said raised faces and said seal seats.

2. In an evaporator connection assembly for connection of an evaporator to a condenser and compressor, and said assembly having:

supply and return lines operatively connected to a condenser and compressor;

evaporator lines for connection with the evaporator;

connection means for receiving and sealingly interconnecting said evaporator lines and said supply and return lines; and said connection means comprising plate means for receiving said supply and return lines block means for receiving said evaporator lines, and securing means for securing said plate means against said block means for sealingly allowing communication of fluid between said evaporator lines and said supply and return lines the improvement comprising;

said plate means including first and second sides, and having an aperture therethrough for fixedly receiving at least one of the supply and return lines and an opening to receive the other of the supply and return lines at said first side thereof;

said plate means having raised faces circumferentially about said aperture and said opening on said second side;

said block means having first and second surfaces, and a pair of passages therethrough for fixedly receiving said evaporator lines at said first surface, and providing a pair of planar seal seats extending about said passages at said second surface thereof;

sealing means providing first and second opposing parallel flat surfaces for sealing between said raised faces and said seal seats; and said raised faces have a face diameter and said sealing means includes a seal diameter wherein said face diameter is greater than the diameter of said seal diameter, and said raised faces having essentially concentrically parallel microscopic surface disparities as a consequence of having been fabricated using a cutting tool establishing line contact with the sealing surfaces of said raised faces.

* * * * *